(12) United States Patent
Cocks et al.

(10) Patent No.: US 10,036,400 B2
(45) Date of Patent: Jul. 31, 2018

(54) CENTRIFUGAL FAN ASSEMBLY AND METHODS OF ASSEMBLING THE SAME

(71) Applicant: Regal Beloit America, Inc., Beloit, WI (US)

(72) Inventors: Rachele B. Cocks, Columbia City, IN (US); Zachary Stauffer, Fort Wayne, IN (US); Rafal Pawel Rohoza, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 493 days.

(21) Appl. No.: 14/268,648

(22) Filed: May 2, 2014

(65) Prior Publication Data

US 2015/0316069 A1 Nov. 5, 2015

(51) Int. Cl.
  *F04D 29/30* (2006.01)
  *F04D 29/28* (2006.01)
  *F04D 29/62* (2006.01)

(52) U.S. Cl.
  CPC ......... *F04D 29/282* (2013.01); *F04D 29/281* (2013.01); *F04D 29/30* (2013.01); *F04D 29/624* (2013.01); *F05D 2240/301* (2013.01); *F05D 2240/305* (2013.01); *Y02T 50/673* (2013.01); *Y10T 29/4933* (2015.01)

(58) Field of Classification Search
  CPC ...... F04D 29/281; F04D 29/282; F04D 29/30; F04D 29/624; F05D 2240/301; Y02T 50/673; Y10T 29/4933
  USPC .......................... 415/203; 416/178, 182, 185
  See application file for complete search history.

(56) References Cited

U.S. PATENT DOCUMENTS

| 3,368,744 | A | * | 2/1968 | Jenn | F04D 29/282 |
| | | | | | 29/889.4 |
| 5,779,443 | A | * | 7/1998 | Haller | F01D 5/141 |
| | | | | | 415/191 |
| 6,042,335 | A | | 3/2000 | Amr | |
| 6,071,077 | A | * | 6/2000 | Rowlands | F01D 5/141 |
| | | | | | 416/223 A |
| 6,358,011 | B1 | | 3/2002 | Tetu et al. | |
| 6,508,630 | B2 | | 1/2003 | Liu et al. | |
| 6,755,615 | B2 | * | 6/2004 | Chapman | F04D 29/023 |
| | | | | | 415/206 |

(Continued)

FOREIGN PATENT DOCUMENTS

| EP | 2213882 A1 | 8/2010 |
| EP | 2426362 A2 | 3/2012 |

OTHER PUBLICATIONS

International Search Report of International Application No. PCT/US15/28856, dated Jul. 31, 2015, pp. 16.

(Continued)

*Primary Examiner* — William McCalister
(74) *Attorney, Agent, or Firm* — Armstrong Teasdale LLP (57) ABSTRACT

A centrifugal fan assembly having an axis of rotation includes an inlet ring, a back plate, and a plurality of blades coupled between the inlet ring and the back plate. At least one blade of the plurality of blades includes a radially inner edge, a radially outer edge, and at least one flow channel extending obliquely therebetween. The at least one flow channel includes an inlet defined on the radially inner edge and an outlet defined on the radially outer edge, wherein the inlet and the outlet are positioned at different axial locations along a length of the blade.

17 Claims, 6 Drawing Sheets

(56) References Cited

U.S. PATENT DOCUMENTS

| | | | |
|---|---|---|---|
| 6,769,876 B2 * | 8/2004 | Sakai | F01D 1/02 |
| | | | 415/206 |
| 7,670,115 B2 * | 3/2010 | Cho | F04D 29/281 |
| | | | 416/186 R |
| 8,057,185 B2 | 11/2011 | Brendel | |
| 8,133,009 B2 * | 3/2012 | Salvesen | F04D 29/023 |
| | | | 415/118 |
| 8,333,559 B2 * | 12/2012 | Bushnell | F04D 29/544 |
| | | | 415/211.2 |
| 2003/0053911 A1 | 3/2003 | Sakai et al. | |
| 2010/0202887 A1 | 8/2010 | Bohl et al. | |
| 2012/0201680 A1 | 8/2012 | Hall et al. | |
| 2012/0308370 A1 | 12/2012 | Nagae et al. | |
| 2013/0084173 A1 | 4/2013 | Fukuda et al. | |
| 2013/0115067 A1 * | 5/2013 | Bronfeld | F01D 5/06 |
| | | | 415/185 |

OTHER PUBLICATIONS

Extended European Search Report for related Application No. 15786076.8-167, dated Dec. 13, 2017, 7 pages.

* cited by examiner

CENTRIFUGAL FAN ASSEMBLY AND METHODS OF ASSEMBLING THE SAME

BACKGROUND

The embodiments described herein relate generally to centrifugal fan assemblies, and more particularly, to centrifugal fan assemblies for use in forced air or air circulating systems.

Many known residential and commercial forced air, heating and air conditioning distribution systems require air propulsion units. In addition to providing movement of air for heating and cooling systems, air propulsion units are often used in combination with condenser units or to supplement other heat transfer operations. Some known air propulsion units are motor driven fans. These fans may be, for example, a centrifugal fan driven by an electric motor.

Centrifugal fans are known to be used to pressurize a rectangular cabinet with air for channeling to other components of the air distribution system. At least some known centrifugal fans include a plurality of blades that are in close proximity to a surface of the cabinet. During operation of at least some known centrifugal fans, the blades rotate about an axis to pull air into the fan in a direction parallel to the rotational axis. As the blades spin, the air is discharged between adjacent blades in a direction perpendicular to the axis of rotation. As such, when the air is discharged, it impinges upon the proximate perpendicular surface of the cabinet and is directed back toward the centrifugal fan. The impinging air may produce noise within the cabinet, any amount of which is objectionable by the user, and may cause a flow disruption with the air being discharged from the centrifugal fan. Any disruption in the airflow may cause a reduction in the overall efficiency of the fan. Moreover, the ejection of the air in a direction perpendicular to that which it entered the fan causes a significant momentum loss, which further reduces centrifugal fan efficiency

BRIEF DESCRIPTION

In one aspect, a centrifugal fan assembly including an axis of rotation is provided. The centrifugal fan assembly includes an inlet ring, a back plate, and a plurality of blades coupled between the inlet ring and the back plate. At least one blade of the plurality of blades includes a radially inner edge, a radially outer edge, and at least one flow channel extending obliquely therebetween. The at least one flow channel includes an inlet defined on the radially inner edge and an outlet defined on the radially outer edge, wherein the inlet and the outlet are positioned at different axial locations along a length of the blade.

In another aspect, a fan blade for use in a centrifugal fan assembly is provided. The blade includes a radially inner edge, a radially outer edge, and at least one flow channel extending obliquely between the radially inner edge and the radially outer edge. The at least one flow channel includes an inlet defined on the radially inner edge and an outlet defined on the radially outer edge, wherein the inlet and the outlet positioned at different axial locations along a length of the blade.

In yet another aspect, a method of forming a centrifugal fan assembly having an axis of rotation is provided. The method includes forming an inlet ring, forming a back plate, and forming a plurality of blades. At least one blade of the plurality of blades includes an inner edge, an outer edge, and at least one flow channel extending obliquely therebetween. The at least one flow channel includes an inlet defined on the radially inner edge and an outlet defined on the radially outer edge, wherein the inlet and the outlet positioned at different axial locations along a length of the each blade. The method also includes coupling the plurality of blades between the inlet ring and the back plate.

DETAILED DESCRIPTION

Figure 1:
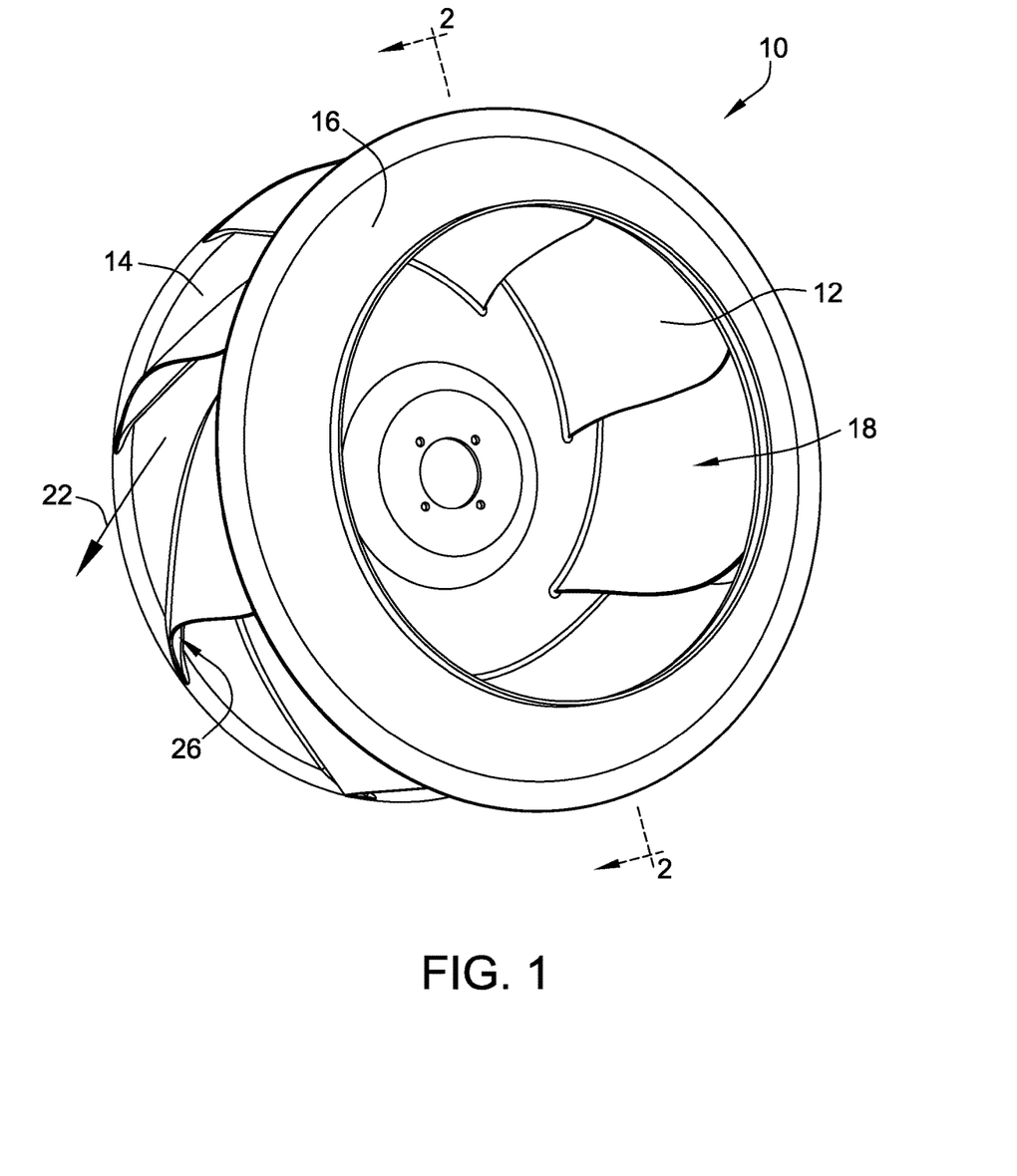
FIG. 1 is a perspective view of an exemplary centrifugal fan assembly.
Figure 2:
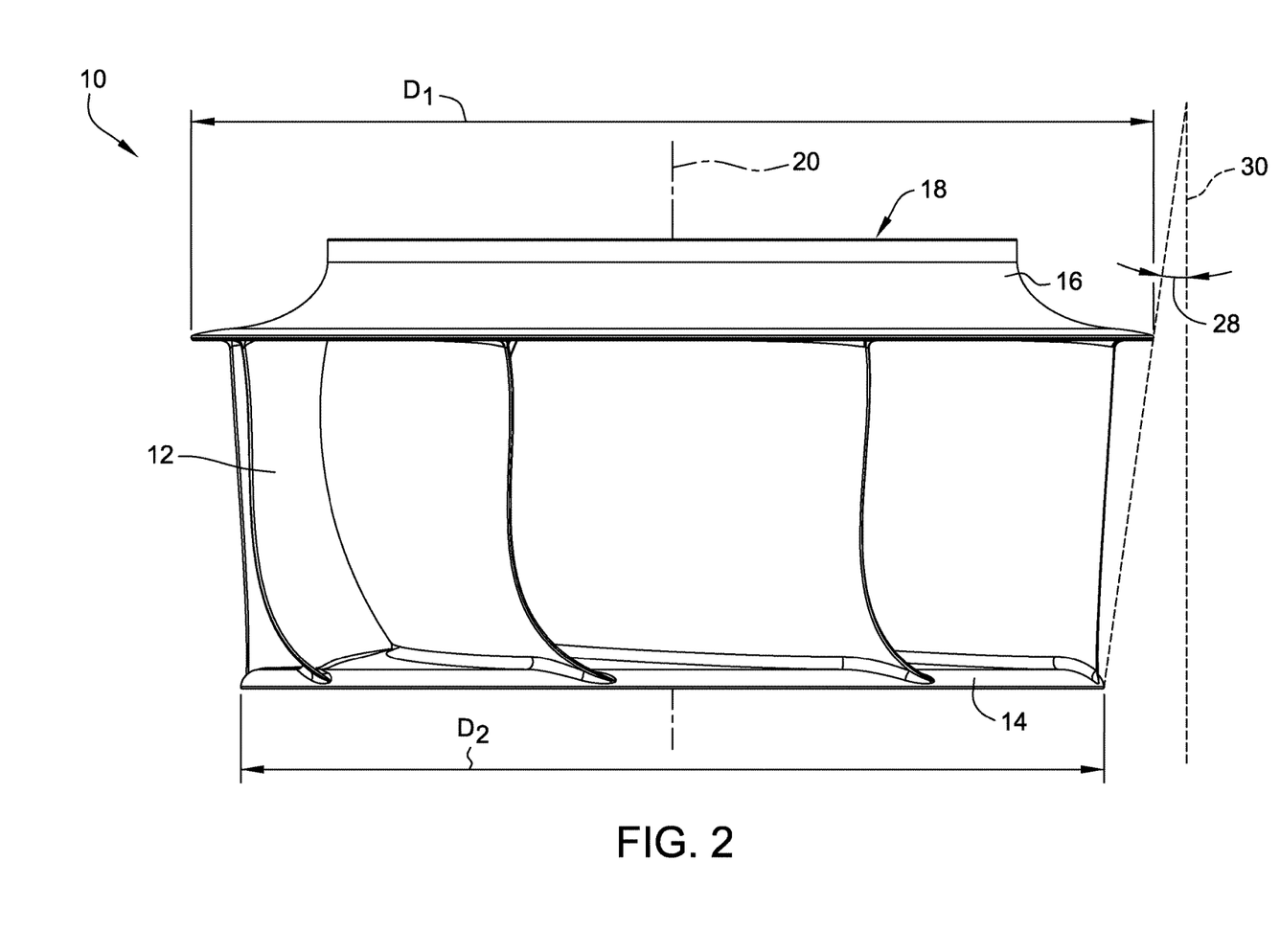
FIG. 2 is a side view of the fan assembly shown in FIG. 1.
Figure 3:
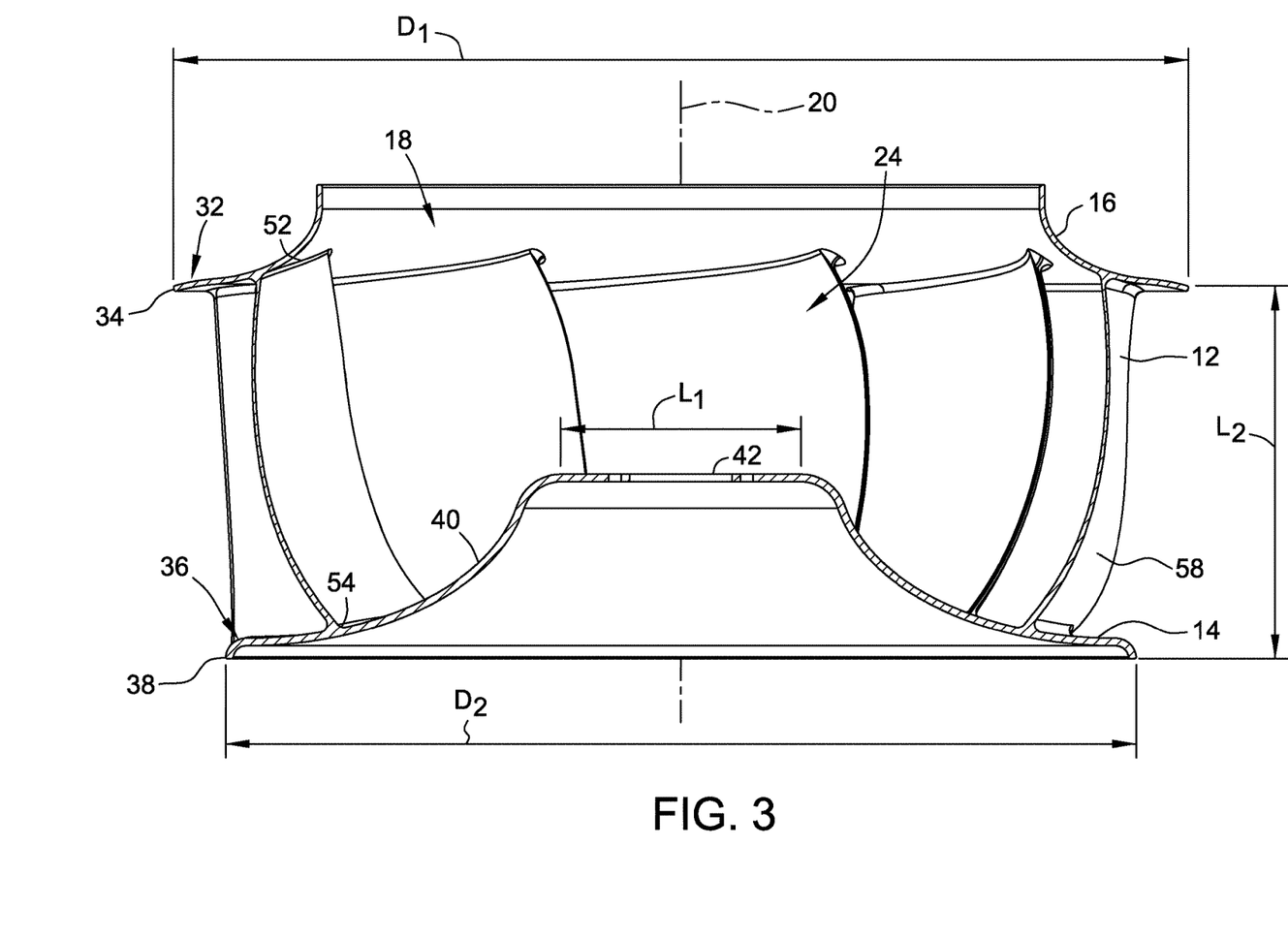
FIG. 3 is a cross-sectional side view of the fan assembly shown in FIG. 1 taken along line 2-2.

FIG. 1 is a perspective view of an exemplary centrifugal fan assembly 10. FIG. 2 is a side view of fan assembly 10, and FIG. 3 is a cross-sectional side view of fan assembly 10 taken along line 2-2. In the exemplary embodiment, fan assembly 10 is configured to produce a flow of air for a forced air system, e.g., a residential HVAC system. Fan assembly 10 includes a plurality of blades 12 coupled between a back plate 14 and an inlet ring 16. Inlet ring 16 includes a central air inlet 18. In the exemplary embodiment, fan assembly 10 includes eight backward inclined blades 12. Alternatively, blades 12 may have any suitable blade shape, for example an airfoil blade, a backward curved blade, a forward curved blade, or a radial blade that enables fan assembly 10 to operate as described herein. Furthermore, fan assembly 10 may include any number of blades 12 that enable operation as described herein.

Back plate 14 and inlet ring 16 are coaxial or substantially coaxial and configured to rotate about a center axis 20. Blades 12 are coupled to back plate 14 and/or inlet ring 16 such that a longitudinal axis of blades 12 is substantially parallel to center axis 20. In one embodiment, each blade 12 is coupled to back plate 14 and/or inlet ring 16 via features formed in back plate 14 and/or inlet ring 16 such as an opening, e.g., a groove or a slot, configured to restrict an amount of movement of blades 12 between back plate 14 and inlet ring 16 while permitting blades 12 to operate as described herein. During rotation, blades 12 are configured to pull in air through inlet 18 defined in inlet ring 14 along center axis 20 and eject the air radially outward through an outlet 22 defined between adjacent blades 12. Outlet 22 is defined as a diverging gap between adjacent blades 12. Blades 12 may be coupled to back plate 14 and/or inlet ring 16 in any manner that permits fan 10 to operate as described herein. Alternatively, fan 10 may include only one of back plate 14 and inlet ring 16.

In the exemplary embodiment, when fan assembly 10 is operating, air enters through central air inlet 18 and is deflected outward from central axis 20 of fan assembly 10 towards blades 12. Blades 12 are configured to pull the air through inlet 18 into a central body portion 24 of fan 12. The air passes through channels between blades 12 and is forced outwards through outlet 22 due to the centrifugal force generated by rotating blades 12. More specifically, at least one blade of plurality of blades 12 includes at least one flow channel 26 that extends obliquely across each blade 12 such that flow channel 26 is configured to accelerate air flowing across blade 12 such that flow channel 26 ejects an airflow 27 in a direction that is at least partially axial, that is, in a direction that is not perpendicular to center axis 20. Furthermore, as described in more detail below, airflow 27 includes an axial vector component (not shown in FIG. 2 or 3) that is parallel to center axis 20 and a radial component (not shown in FIG. 2 or 3) that is perpendicular to center axis 20 such that airflow 27 exits flow channel 26 in a direction oriented obliquely with respect to center axis 20. In addition, in some known fans, the volume of airflow forced outwards changes with respect to the speed of the fan's rotation.

As shown in FIGS. 2 and 3, inlet ring 16 includes an outer diameter D1 that is larger than an outer diameter D2 of back plate 14. As such, fan assembly 10 includes a taper angle 28 defined with respect to a line 30, which is parallel to center axis 20. Taper angle 28 is oriented obliquely with respect to center axis to facilitate, along with flow channel 26, providing an axial vector component to airflow 27 as it is discharged from flow channel 26.

In the exemplary embodiment, inlet ring 16 includes an end portion 32 that includes a radially outer edge 34 of inlet ring 16. End portion 32 is curled downward towards blades 12 such that inlet ring 16 includes an S-shaped cross-sectional profile, as seen in FIG. 3. Sloped end portion 32 facilitates mitigating recirculation of air in a direction opposite back plate 14 such that end portion 32 is configured to reduce or prevent air from exiting outlet 22 and then recirculating up and back into fan assembly 10 through inlet 18. Furthermore, sloped end portion 32 is also configured to turn airflow 27 downward toward back plate 14 to impart an axial vector component on the direction of airflow 27. Similarly, in the exemplary embodiment, back plate 14 includes a radially outer end portion 36 that includes a radially outer edge 38 of back plate 14. End portion 36 is curled downward away from blades 12 such that back plate 14 includes an S-shaped cross-sectional profile, as seen in FIG. 3. In the exemplary embodiment, end portion 32 includes a first radius of curvature and end portion 36 includes a second radius of curvature smaller than the first radius of curvature such that end portion 36 of back plate 14 curves more sharply downward than end portion 32 of inlet ring 16. Furthermore, curved end portion 36 is also configured to accelerate and turn airflow 27 downward to impart an axial vector component on the direction of airflow 27 via the Coandă effect.

In the exemplary embodiment, back plate 14 also includes an annular sloped portion 40 having the shape of a portion of an ellipse. A substantially flat mounting surface 42 is positioned at a center of annular sloped portion 40. In the exemplary embodiment, mounting surface 42 is configured to receive a motor (not shown) mounted thereto and has a length L1 substantially equal to a diameter of the motor. Sloped portion 40 is configured to extend to mounting surface 42 such that when air flows into fan assembly 10 over the motor, sloped portion 40 is configured to gradually turn the airflow within central body portion 24 towards the radial direction. As such, sloped portion 40 improves the efficiency of fan assembly 10 by preventing the incoming airflow from impinging upon a surface perpendicular to the direction of the airflow. Alternatively, mounting surface 42 may receive a guiding element (not shown) instead of a motor, wherein the guiding element is configured to further guide the airflow entering fan assembly 10 through inlet 18.

Figure 4:
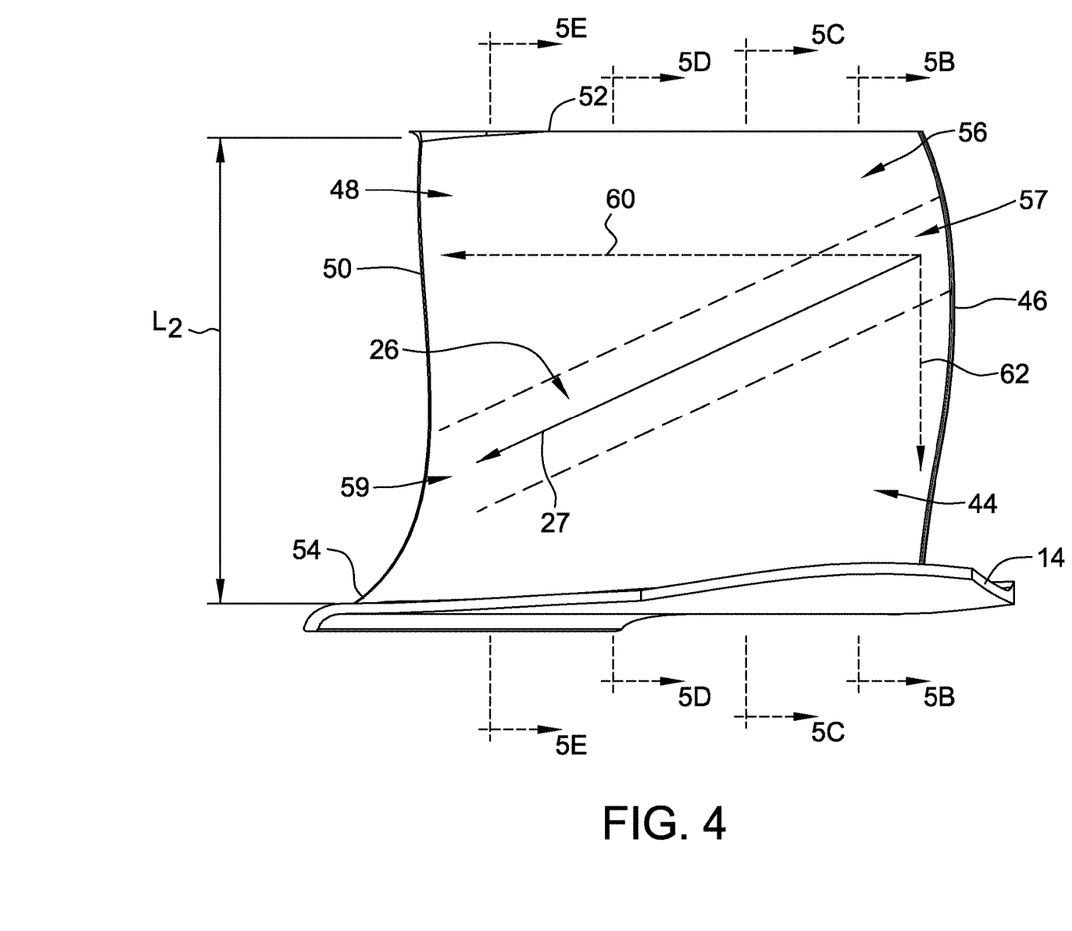
FIG. 4 is a side view of an exemplary fan blade that may be used with the fan assembly shown in FIG. 1.

FIG. 4 is a side view of an exemplary fan blade 12 that may be used with fan assembly 10 (shown in FIG. 1). In the exemplary embodiment, each blade 12 includes a radially inner end 44 having an inner edge 46, a radially outer end 48 having an outer edge 50, a top edge 52, an opposing bottom edge 54, and a length L2 extending between top edge 52 and bottom edge 54. In one embodiment, at least one of radially inner and outer edge 46 and 50 are substantially S-shaped. In an alternative embodiment, at least one of radially inner and outer edges 46 and 50 are airfoil-shaped. Top edge 52 is coupled to inlet ring 16 and terminates at radially outer edge 34 thereof. Similarly, bottom edge 54 is coupled to back plate 14 and terminates at radially outer edge 38 thereof. As such, outer edge 50 of each blade 12 extends between radially outer edges 34 and 38 of inlet ring 16 and back plate 14, respectively, such that airflow 27 contacts each blade 12 for same amount of time as the adjacent structure, back plate 14 or inlet ring 16, to facilitate accelerating and guiding airflow 27 in an at least partially axial direction.

In the exemplary embodiment, each blade 12 also includes a convex pressure side 56 and a concave suction side 58 (shown in FIG. 3), wherein flow channel 26 is defined on convex pressure side 56. As described above, flow channel 26, shown in broken lines in FIG. 4, extends obliquely across pressure side 56 of blade 12 between inner edge 46 and outer edge 50 such that flow channel 26 is configured to accelerate and expand airflow 27 along blade 12. More specifically, in the exemplary embodiment, flow channel 26 includes an inlet 57 defined on radially inner edge 46 and an outlet 59 defined on radially outer edge 50. In the exemplary embodiment, inlet 57 and outlet 59 are positioned at different axial locations, with respect to axis 20, along length L2 of blade 12. More specifically, inlet 57 and outlet 59 are spaced apart by a predetermined axial distance to achieve desired fan assembly 10 performance objectives. In one embodiment, inlet 57 is positioned proximate inlet ring 16 and outlet is positioned proximate back plate 14. In another embodiment, inlet 57 is positioned proximate back plate 14 and outlet is positioned proximate inlet ring 16.

Flow channel 26 is further configured to discharge airflow 27 in a direction that is at least partially axial, that is, in a direction that is not perpendicular to axis 20. More specifically, flow channel 26 provides airflow 27 with both a radial vector component 60 perpendicular to center axis 20 and an axial vector component 62 parallel to center axis 20 such that airflow 27 impinges upon a surface of a cabinet that houses fan assembly 10 at an oblique angle. As such, flow channel 26 facilitates reducing noise generated by airflow 27 impacting the cabinet at an angle perpendicular to the surface and also facilitates reducing airflow disruption within the cabinet, which increases the efficiency of fan assembly 10.

In the exemplary embodiment, flow channel 26 has a substantially constant slope between inlet 57 at inner edge 46 and outlet 59 at outer edge 50. More specifically, flow channel 26 is substantially linear across pressure side 56 and is defined along blade 12 between inlet 57 and outlet 59 at an angle between approximately 20 degrees and approximately 50 degrees. In an alternative embodiment, the slope of flow channel 26 may be non-linear, such as but not limited to quadratic or exponential, such that flow channel 26 includes at least one curve between inlet 57 and outlet 59. Generally, flow channel 26 may be linear, non-linear, or a combination thereof. Furthermore, the shape of flow channel 26 may be based on physical or operational characteristics of fan assembly 10 such as, but not limited to, the size and/or the running speed of fan 10. Generally, flow channel 26 may be any shape and have any slope between inlet 57 and outlet 59 that facilitates operation of fan assembly 10 as described herein.

As shown in FIG. 4, inlet 57 and outlet 59 are substantially similar in size such that flow channel 26 includes a substantially uniform width between inlet 57 and outlet 59. Alternatively, inlet 57 and outlet 59 may include different sizes such that flow channel 26 includes a varying width between inlet 57 and outlet 59. More specifically, in one alternative embodiment, inlet 57 is larger than outlet 59 such that flow channel 26 diverges across pressure side 56 between inlet 57 and outlet 59. In another alternative embodiment, inlet 57 is smaller than outlet 59 such that flow channel 26 converges across pressure side 56 between inlet 57 and outlet 59. Furthermore, a portion of flow channel 26 may be convergent, while another portion of flow channel 26 is divergent. Generally, flow channel 26 may include a width that is uniform, convergent, divergent, or any combination thereof between inlet 57 and outlet 59.

Figure 5A:
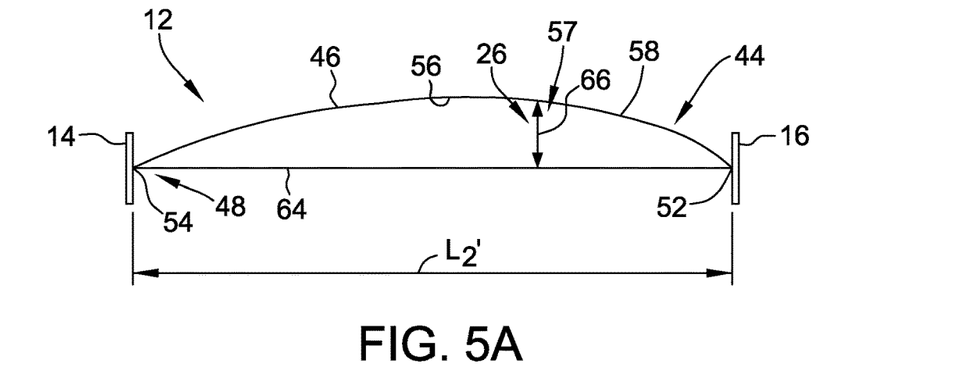
FIGS. 5A-5F are cross-sectional views of the fan blade shown in FIG. 4 taken at various points along the fan blade.
Figure 5B:
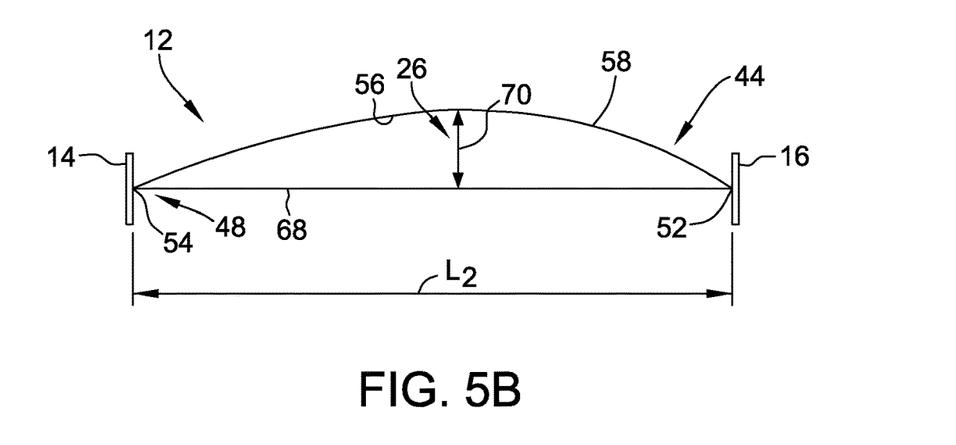
Figure 5C:
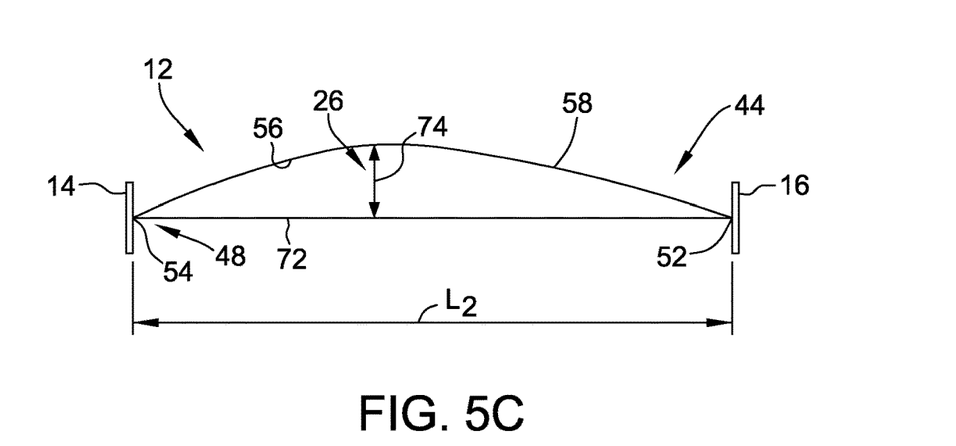
Figure 5D:
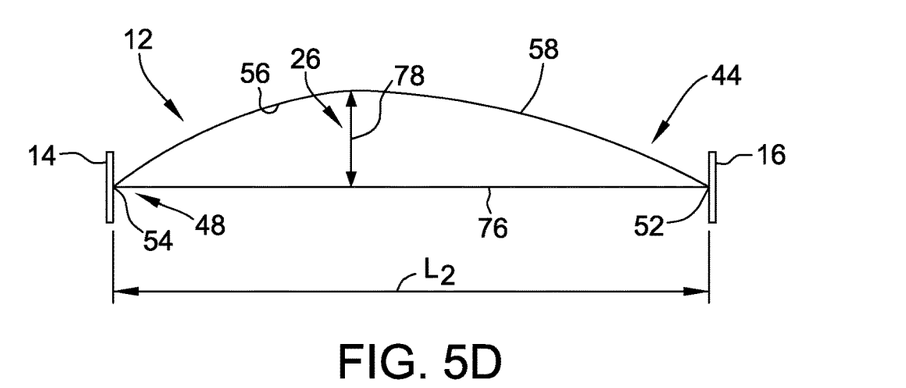
Figure 5E:
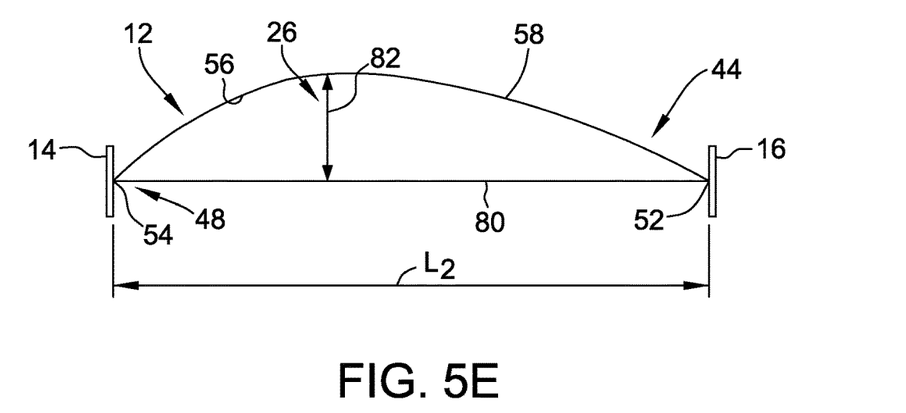
Figure 5F:
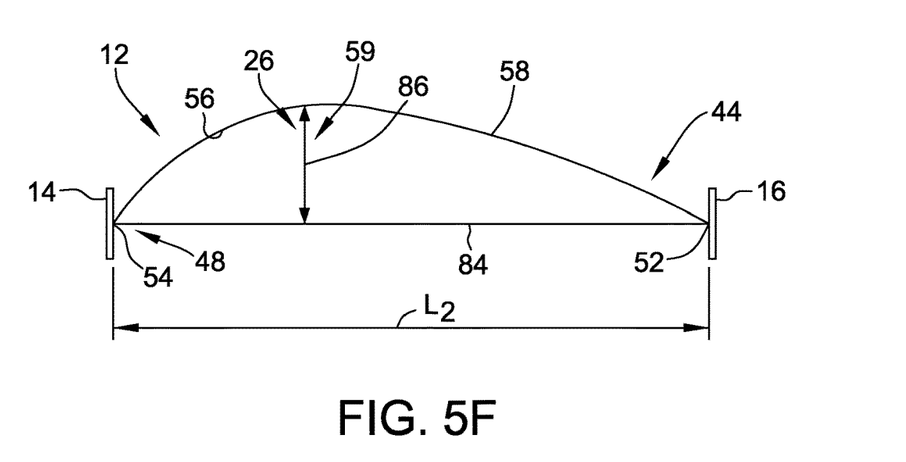

FIGS. 5A-5F are views of fan blade 12 taken at respective locations along blade 12 as shown in FIG. 4. More specifically, FIG. 5A is an end view of blade 12 illustrating inlet 57 at inner edge 46, FIG. 5F is an end view of blade 12 illustrating outlet 59 at outer edge 50, and FIGS. 5B-5E are cross-sectional views of blade 12 taken along respective locations indicated in FIG. 4. FIGS. 5A-5F collectively show an exemplary shape of flow channel 26 along pressure side 56 of blade 12 between inlet 57 and outlet 59. The shape of flow channel 26 shown in FIGS. 5A-5F is for exemplary purposes only and it is contemplated that flow channel 26 may take any shape from inner edge 46 to outer edge 50 that facilitates operation of fan assembly 10 as described herein.

FIG. 5A illustrates a chord line 64, which is substantially parallel to center axis 20, extending between top edge 52 and bottom edge 54 of blade 12 such that chord 64 has a length substantially similar to length L2 of blade 12 along inner edge 46. A maximum camber distance 66 is defined at the point where chord 64 and blade 12 are furthest apart, that is, maximum camber 66 of blade 12 is located at inlet 57 of flow channel 26. In the exemplary embodiment, maximum camber 66 at inner edge 46 is located approximately one third of length L2 away from inlet ring 16. Alternatively, maximum camber 66 may be located at any point along length L2 that facilitates operation of fan assembly 10 as described herein.

Referring now to FIG. 5B, a chord line 68 extends between top edge 52 and bottom edge 54 of blade 12 such that chord 68 has a length substantially similar to length L2 of blade 12 at location 5B (shown in FIG. 4). A maximum camber distance 70 is defined at the point where chord 68 and blade 12 are furthest apart, that is, maximum camber 70 of blade 12 is located along flow channel 26. Similarly, FIGS. 5C-5E illustrate chord lines 72, 76, and 80, respectively, such that chords 72, 76, and 80 each have a length that is substantially similar to length L2 of blade 12 at locations 5C, 5D, 5E (all shown in FIG. 4). Referring to FIG. 5C, a maximum camber distance 74 is defined at the point where chord 72 and blade 12 are furthest apart, that is, maximum camber 74 of blade 12 is located along flow channel 26. Similarly, with respect to FIGS. 5D and 5E, maximum camber distances 78 and 82 are defined at the point where chords 76 and 80 are located furthest from blade 12 such that maximum cambers 78 and 82 of blade 12 are located along flow channel 26.

FIG. 5F illustrates a chord line 84, which is substantially parallel to center axis 20, extending between top edge 52 and bottom edge 54 of blade 12 such that chord 84 has a length substantially similar to length L2 of blade 12 along outer edge 50. A maximum camber distance 86 is defined at the point where chord 84 and blade 12 are furthest apart such that maximum camber 86 of blade 12 is located at outlet 59 of flow channel 26. In the exemplary embodiment, maximum camber 86 at outer edge 50 is located approximately two thirds of the length of length L2 away from inlet ring 16. Alternatively, maximum camber 86 may be located at any point along length L2 that facilitates operation of fan assembly 10 as described herein.

The present disclosure provides an exemplary fan assembly with a flow channel defined in each of a plurality of blades that reduces noise generation of the fan assembly within a cabinet and also improves the efficiency of the fan assembly. More specifically, the exemplary fan assembly includes an inlet ring, a back plate, and a plurality of blades coupled therebetween. Each blade includes an inner edge, an outer edge, and a flow channel extending obliquely therebetween. The flow channel includes an inlet defined on the radially inner edge and an outlet defined on the radially outer edge, wherein the inlet and the outlet are positioned at different axial locations along a length of each blade. The flow channel is configured to discharge an airflow in a direction that is at least partially axial, that is, in a direction that is not perpendicular to an axis of rotation of the fan. As such, the flow channel allows the exemplary fan assembly to move a greater volume of air and operate at an increased efficiency level compared to at least some known fan assemblies. Furthermore, at least some known fan assemblies discharge the airflow perpendicular to the rotational axis such that the exiting airflow impinges upon a fan cabinet surface that is perpendicular to the direction of the airflow. The impact of the airflow with the cabinet produces noise. The exemplary flow channel turns the airflow as it flows across the blades such that the exiting airflow impinges on a cabinet surface that is oriented obliquely with respect to the direction of the airflow. As such, the exemplary fan assembly produces less noise than known fan assemblies.

The embodiments described herein relate to a centrifugal fan assembly and methods of assembling the same. More specifically, the embodiments relate to a fan assembly that includes a plurality of blades each having a flow channel defined therein that extends obliquely along the length of the blade and is configured to accelerate and expand an airflow along the blade. More particularly, the embodiments relate to a flow channel that turns an airflow flowing therethrough such that the airflow exits the fan assembly in at least a partially axial direction. The methods and apparatus are not limited to the specific embodiments described herein, but rather, components of apparatus and/or steps of the methods may be utilized independently and separately from other components and/or steps described herein. For example, the methods may also be used in combination with a forward curved fan or blower assembly, and are not limited to practice with only the backward curved fan as described herein. In addition, the exemplary embodiment can be implemented and utilized in connection with many other HVAC applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A centrifugal fan assembly including an axis of rotation, said assembly comprising:
   an inlet ring including a first diameter, wherein said first diameter comprises an outermost diameter of said inlet ring;
   a back plate including a second diameter smaller than the first diameter, wherein said second diameter comprises an outermost diameter of said back plate; and
   a plurality of blades coupled between said inlet ring and said back plate, wherein at least one blade of said plurality of blades includes a radially inner edge, a radially outer edge, and at least one flow channel extending obliquely therebetween, wherein said flow channel defines a maximum camber extending obliquely between said radially inner edge and said radially outer edge, a first maximum camber location is spaced a first radial distance from the axis of rotation and a first axial distance from said back plate, a second maximum camber location is spaced a second radial distance from the axis of rotation and a second axial distance from said back plate, wherein said second radial distance greater than said first radial distance and said first axial distance greater than said second axial distance, wherein said flow channel includes an inlet defined on said radially inner edge that defines an inlet maximum camber and an outlet defined on said radially outer edge that defines an outlet maximum camber, said inlet and said outlet positioned at different axial locations along a length of said each blade;
   wherein said inlet is defined proximate said inlet ring and said outlet is defined proximate said back plate.

2. The centrifugal fan assembly in accordance with claim 1, wherein said flow channel defines a slope that is linear between said inlet and said outlet.

3. The centrifugal fan assembly in accordance with claim 1, wherein said flow channel defines a width that is uniform between said inlet and said outlet.

4. The centrifugal fan assembly in accordance with claim 1, wherein each blade of said plurality of blades includes a top edge adjacent said inlet ring, a bottom edge adjacent said back plate, and a chord line that is parallel to said axis of rotation extending between said top edge and said bottom edge, wherein said flow channel defines the maximum camber between said chord line and said blade.

5. The centrifugal fan assembly in accordance with claim 1, wherein the first diameter and the second diameter form a taper angle oriented obliquely with respect to the axis of rotation.

6. The centrifugal fan assembly in accordance with claim 1, wherein said inlet ring includes a radially outer tip portion that is curled towards said plurality of blades such that said inlet ring includes a substantially S-shaped cross-sectional profile.

7. The centrifugal fan assembly in accordance with claim 1, wherein said back plate includes a radially outer tip portion that is curled away from said plurality of blades such that said back plate includes a substantially S-shaped cross-sectional profile.

8. A fan blade for use with a centrifugal fan assembly having an axis of rotation, said blade comprising:
   a radially inner edge;
   a radially outer edge;
   at least one flow channel extending obliquely between said radially inner edge and said radially outer edge, wherein said flow channel includes an inlet defined on said radially inner edge that defines an inlet maximum camber and an outlet defined on said radially outer edge that defines an outlet maximum camber, said inlet and said outlet positioned at different axial locations along a length of said each blade, wherein said flow channel is configured to discharge an airflow from said outlet in an oblique direction with respect to the axis of rotation, and wherein a maximum camber of said fan blade is defined along said flow channel between said radially inner edge and said radially outer edge, a first maximum camber location is spaced a first radial distance from the axis of rotation and a first axial distance from said back plate, a second maximum camber location is spaced a second radial distance from the axis of rotation and a second axial distance from said back plate, wherein said second radial distance greater than said first radial distance and said first axial distance greater than said second axial distance;
   wherein said inlet is defined proximate said inlet ring and said outlet is defined proximate said back plate.

9. The fan blade in accordance with claim 8, wherein said flow channel defines a width that is uniform between said inlet and said outlet.

10. The fan blade in accordance with claim 8, wherein said flow channel defines a slope that is linear between said inlet and said outlet.

11. The fan blade in accordance with claim 8, wherein at least one of said radially inner and said radially outer edges are S-shaped.

12. The fan blade in accordance with claim 8 further comprising a top edge, a bottom edge, and a chord line extending therebetween, wherein said flow channel defines the maximum camber between said chord line and a surface of the blade.

13. A method of forming a centrifugal fan assembly having an axis of rotation, said method comprising:
   forming an inlet ring including a first diameter, wherein the first diameter includes an outermost diameter of the inlet ring;
   forming a back plate including a second diameter smaller than the first diameter, wherein the second diameter includes an outermost diameter of the back plate;
   forming a plurality of blades, wherein at least one blade of the plurality of blades includes a radially inner edge, a radially outer edge, and at least one flow channel extending obliquely therebetween, wherein the flow channel defines a maximum camber extending obliquely between the radially inner edge and the radially outer edge, a first maximum camber location is spaced a first radial distance from the axis of rotation and a first axial distance from the back plate, a second maximum camber location is spaced a second radial distance from the axis of rotation and a second axial distance from the back plate, wherein the second radial distance greater than the first radial distance and the first axial distance greater than the second axial distance, wherein the flow channel includes an inlet defined on the radially inner edge that defines an inlet maximum camber and an outlet defined on the radially outer edge that defines an outlet maximum camber, the inlet and the outlet positioned at different axial locations along a length of the each blade; and coupling the plurality of blades between the inlet ring and the back plate;

wherein said forming a plurality of blades further comprises forming the plurality of blades such that the inlet is defined proximate the inlet ring and the outlet is defined proximate the back plate.

14. The method in accordance with claim 13, wherein forming a plurality of blades further comprises forming the plurality of blades such that the flow channel defines a slope that is linear between the inlet and the outlet.

15. The method in accordance with claim 13, wherein forming a plurality of blades further comprises forming the plurality of blades such that the flow channel defines a width that is uniform between the inlet and the outlet.

16. The centrifugal fan assembly in accordance with claim 15, wherein the first diameter and the second diameter form a taper angle oriented obliquely with respect to the axis of rotation.

17. The method in accordance with claim 13, wherein forming an inlet ring further comprises forming an inlet ring that includes a first radially outer tip portion curled towards the plurality of blades, and wherein forming a back plate further comprises forming a back plate that includes a second radially outer tip portion curled away from the plurality of blades such that the inlet ring and the back plate include an S-shaped cross-sectional profile.

* * * * *